United States Patent [19]

Ito et al.

[11] Patent Number: 5,073,885
[45] Date of Patent: Dec. 17, 1991

[54] OPTICAL MEMORY DISC DRIVING APPARATUS

[75] Inventors: Osamu Ito; Shigeo Hayashi, both of Amagasaki, Japan

[73] Assignee: Mitsubishi Denki Kabushiki Kaisha, Tokyo, Japan

[21] Appl. No.: 237,222

[22] Filed: Aug. 26, 1988

[30] Foreign Application Priority Data

Aug. 31, 1987 [JP] Japan ................. 62-218893

[51] Int. Cl.$^5$ ............................................. G11B 7/085
[52] U.S. Cl. ............................. 369/44.28; 369/44.29; 369/44.36; 369/54
[58] Field of Search ................ 369/32, 43, 124, 44.25, 369/44.28, 44.29, 44.35, 44.36, 54; 250/201.4, 201.5

[56] References Cited

U.S. PATENT DOCUMENTS

| 4,563,760 | 1/1986 | Maeda et al. | 250/201.4 |
| 4,701,897 | 10/1987 | Nakagawa | 369/43 X |
| 4,743,774 | 5/1988 | Maeda et al. | 369/124 X |
| 4,764,860 | 8/1988 | Takao | 369/43 |
| 4,788,421 | 11/1988 | Ogawa et al. | 250/201.5 |
| 4,817,069 | 3/1989 | Shigemori | 369/43 X |
| 4,853,913 | 8/1989 | Maeda | 369/43 X |
| 4,866,687 | 9/1989 | Kasai et al. | 369/43 X |

FOREIGN PATENT DOCUMENTS

| 58-41447 | 3/1983 | Japan |  |
| 59-65936 | 4/1984 | Japan | 369/124 |
| 61-260474 | 11/1986 | Japan |  |
| 62-26647 | 2/1987 | Japan |  |

Primary Examiner—Roy N. Envall, Jr.
Assistant Examiner—W. R. Young
Attorney, Agent, or Firm—Wolf, Greenfield & Sacks

[57] ABSTRACT

An optical disc driving apparatus is provided for the access control system with respect to the optical disc, comprising emphasizing circuits which compensate for a decrease in the frequency response of a reproduced signal from an optical head and further comprising peak detection circuits for detecting envelopes of the output signals. The emphasizing circuits and peak detection circuits are not used for processing of the tracking servo sensor signal, therefore the compensation amount need not be accurately controlled. The characteristic of the reproduced signal of the optical disc is effectively utilized, thereby enabling the compensation amount to be used over a wider range from about a proper value to an excessive value. In addition, being able to use the compensation amount over a wider range results in a reduction in the number of separate stages of compensation.

7 Claims, 5 Drawing Sheets

OUTPUT OF PREAMPLIFIER 8a

OUTPUT OF PREAMPLIFIER 8b

OUTPUT OF ADDING AMPLIFIER 12

OUTPUT OF DIFFERENTIAL AMPLIFIER 11

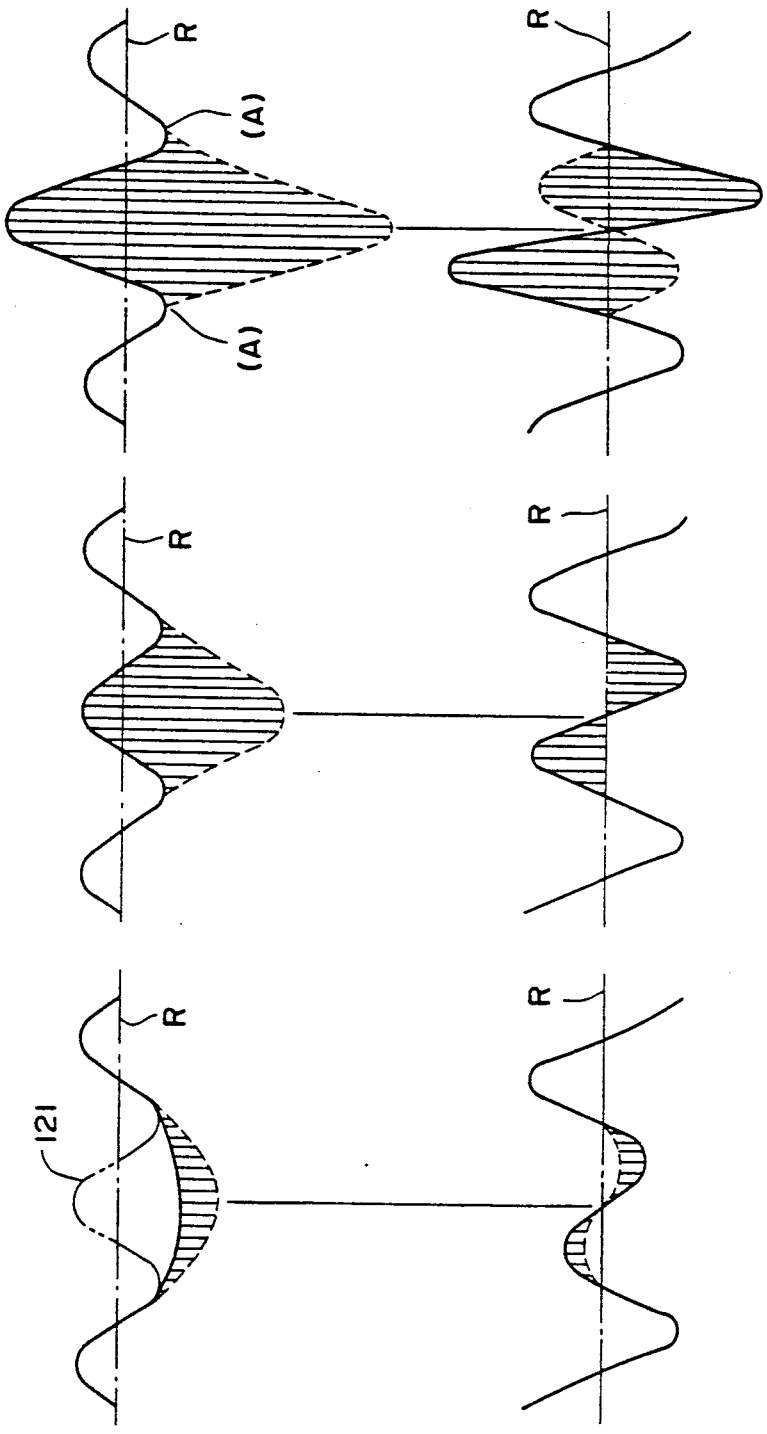

OPTICAL MEMORY DISC DRIVING APPARATUS

BACKGROUND OF THE INVENTION

1. Field of the Invention

The present invention relates generally to an optical disc driving apparatus for processing a signal obtained from the optical disc so as to reproduce the information recorded thereon, and more particularly to access control of an optical head at the optical disc driving apparatus.

2. Description of the Prior Art

In the conventional optical disc driving apparatus, a push pull method using a pair of photo detectors is well-known as the method to detect a track error. This method comprises a tracking sensor signal which is the sensor signal of the tracking servo, obtained from a difference signal between the divided photo detectors and a radio frequency (RF) signal used for data demodulation or the like obtained from a sum signal thereof. The speed of the optical disc is detected from a cycle period of a sinewave like tracking sensor signal or the RF signal when the light spot traverses a guide groove on the optical disc, thereby performing the access control. The method is disclosed in, for example, the Japanese Patent Application Laid Open Gazette No. 61-260474 (1986).

With this method, however, if the information is recorded on a guide groove or between the guide grooves, the tracking sensor signal and RF signal are subjected to modulation by the recorded information signal, thus disturbing said signals and therefore interfering with the detection of a cycle period. In addition, when the tracking sensor signal is supplied directly to the tracking servo, the sensor signal amplitude is lowered thus varying the gain and therefore making the tracking unstable.

In order to prevent this problem, a method is disclosed in the Japanese Patent Laid Open No. 58-41447 (1983), which uses a peak detection circuit to prevent variation in the reproduced signal caused by the recorded pits. However, the recording pit intervals tend to be reduced due to recent high density recording. In this case, despite the use of the peak detection circuit, the optical frequency characteristic of the information signal decreases the level of the information signal resulting in decreases in the tracking and RF signal levels.

In order to solve the above problem, as shown in, for example, the Japanese Patent Laid-Open No. 62-26647 (1987), an emphasizing circuit is provided which compensates for the decrease in the frequency response of the information signal, and a method is provided for flattening the frequency characteristic by the emphasizing circuit so as to detect the peak. This method eliminates the amplitude reduction of the tracking sensor signal and the RF signal, operates the tracking servo in a stable manner so that it is not modulated by the information signal, and can properly detect the track traverse, thereby being effective in stabilization of access control.

The preceding example, however, requires the same processing for both the tracking servo sensor signal and the access track count detector signal, whereby the frequency characteristic must be accurately compensated for. Accurate processing is required because in order to stably operate the tracking servo, the gain thereof needs to be kept constant, because there is a fear that when the gain of the servo decreases, the tracking accuracy of the servo diminishes and when the gain of the servo rises, the servo may oscillate. Since the gain of the tracking servo changes in proportion to the amplitude of the tracking sensor signal, any variations in the sensor signal amplitude must be completely restrained and therefore, the frequency characteristic must be compensated for accurately. Since the frequency characteristic changes as a function of the radius of the disc, the emphasizing circuit must be fine-tunable at various states and therefore results in a complicated circuit design.

SUMMARY OF THE INVENTION

In view of the above circumstances, the present invention has been designed. An object thereof is to provide an optical disc driving apparatus which makes the compensation amount of the emphasizing circuit usable in a wider range from an approximately proper value to an excess value. Having a compensating circuit that operates over a wide range reduces the number of stages required for compensation of the frequency characteristic when moving from the inner circumference to the outer circumference of an optical disc. Thus, the circuit design may be simplified, miniaturized, and manufactured at a low cost.

The optical disc driving apparatus is provided only for the access control system with respect to the optical disc including emphasizing circuits that compensate for a decrease in the frequency response of a reproduced signal from an optical head and peak detection circuits for detecting envelopes of output signals. In such a construction, the emphasizing circuit and peak detection circuit are not used for processing the tracking servo sensor signal, therefore, the compensation amount of the emphasizing circuit need not be controlled with accuracy. In addition, the characteristic of the reproduced signal of the optical disc is effectively used, thereby enabling the compensation amount to be used over a wide range from about a proper value to an excess value. Hence, the number of stages required for the compensation amount is largely reducible.

The above and further objects and features of the invention will more fully be apparent from the following detailed description taken in conjunction with the accompanying drawings.

DESCRIPTION OF THE PREFERRED EMBODIMENTS

Next, an embodiment of an optical disc driving apparatus of the invention will be described in detail in accordance with the accompanying drawings.

Figure 1:
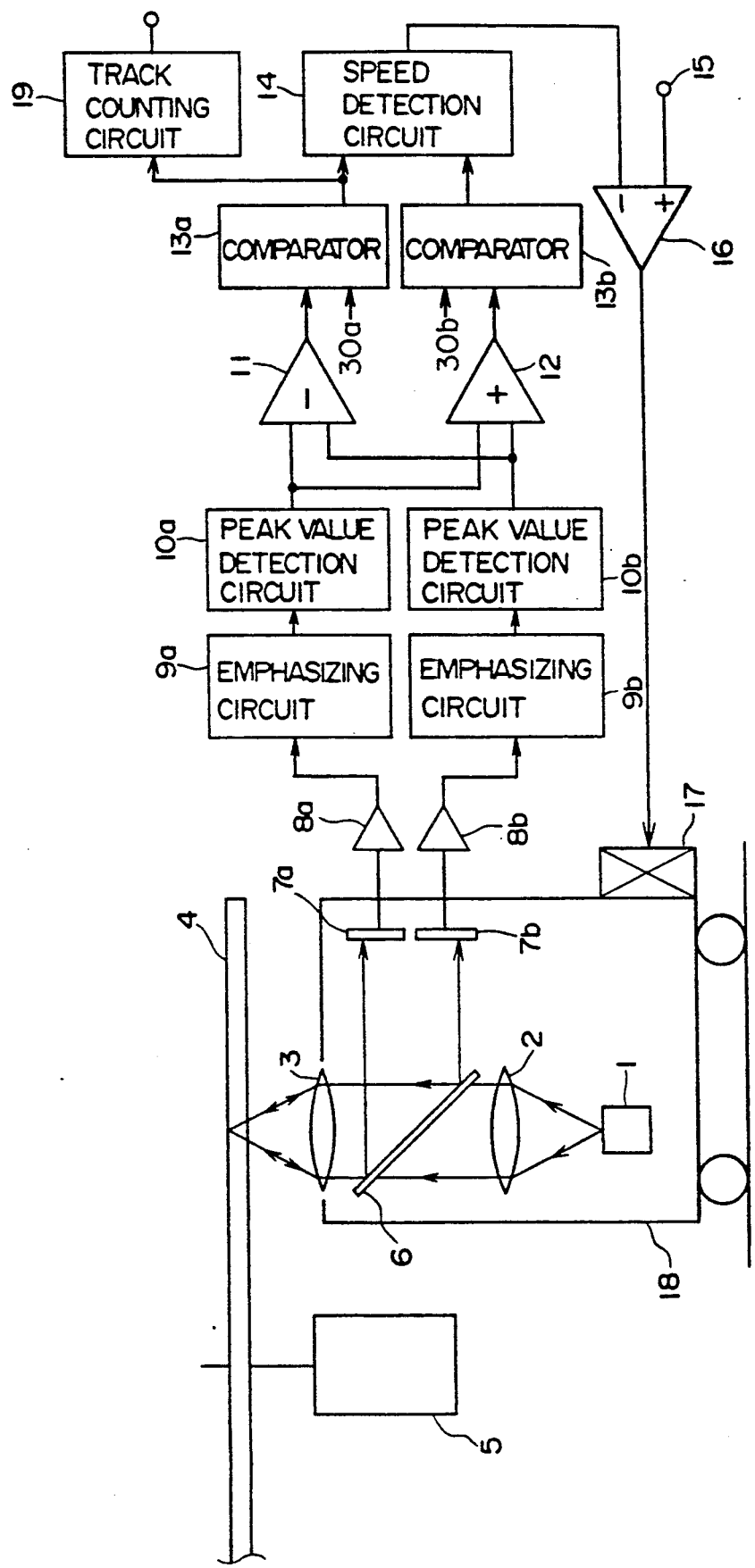
FIG. 1 is a block diagram of an entire optical disc driving apparatus of the invention.
Figure 2A:
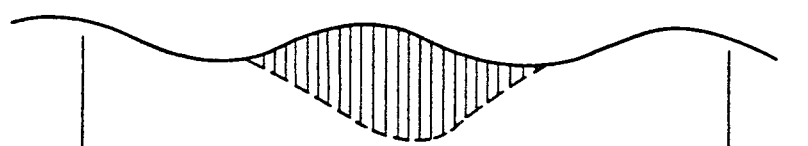
FIGS. 2(a-e) and 3(a-c) are waveform charts and typical views of tracks of the optical disc driving apparatus of the invention.
Figure 2B:
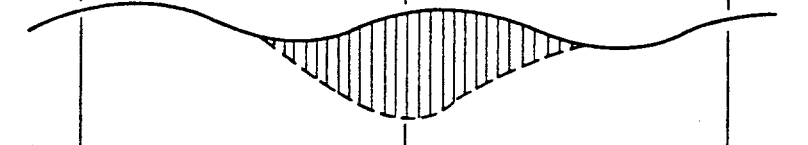
Figure 2C:
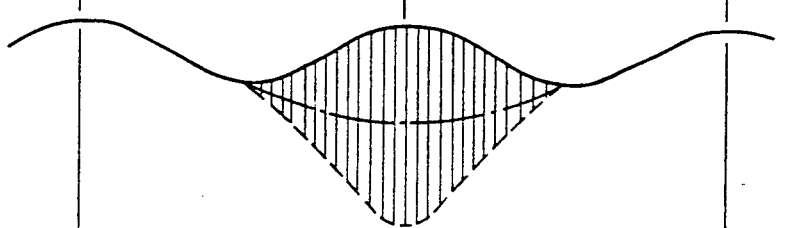
Figure 2D:
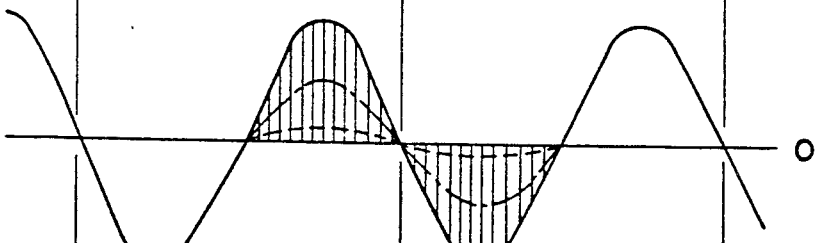
Figure 2E:
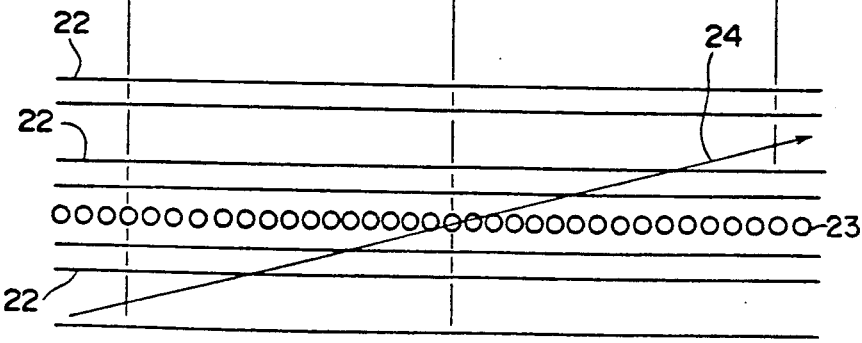

FIG. 1 is a block diagram of the entire optical disc driving apparatus of the invention.

In FIG. 1, reference numeral 1 designates a semiconductor laser oscillator. The laser beam emitted therefrom is transmitted through a collimator lens 2 and a beam splitter 6 and then reaches a condensing lens 3 so as to be focused on a signal recording surface of the optical disc and reflected therefrom. In addition, the optical disc 4 is rotated by a disc motor 5.

The laser beam reflected from the optical disc 4 is transmitted through the condensing lens 3, reflected by the beam splitter 6, and divided into two, thereby being converted by photo detectors 7a and 7b into current signals respectively.

The current signals outputted from the photo detectors 7a and 7b are converted by preamplifiers 8a and 8b into voltage signals respectively and decreases in the frequency response thereof are compensated for by emphasizing circuits 9a and 9b and thereafter inputted to peak value detection circuits 10a and 10b respectively.

The outputs of both the peak value detection circuits 10a and 10b are inputted to a differential amplifier 11 and an adding amplifier 12 respectively, the differential amplifier 11 outputting a difference signal between the output signals of both the peak value detection circuits 10a and 10b, the adding amplifier 12 outputting a sum signal of the outputs of the same.

Figure 5:
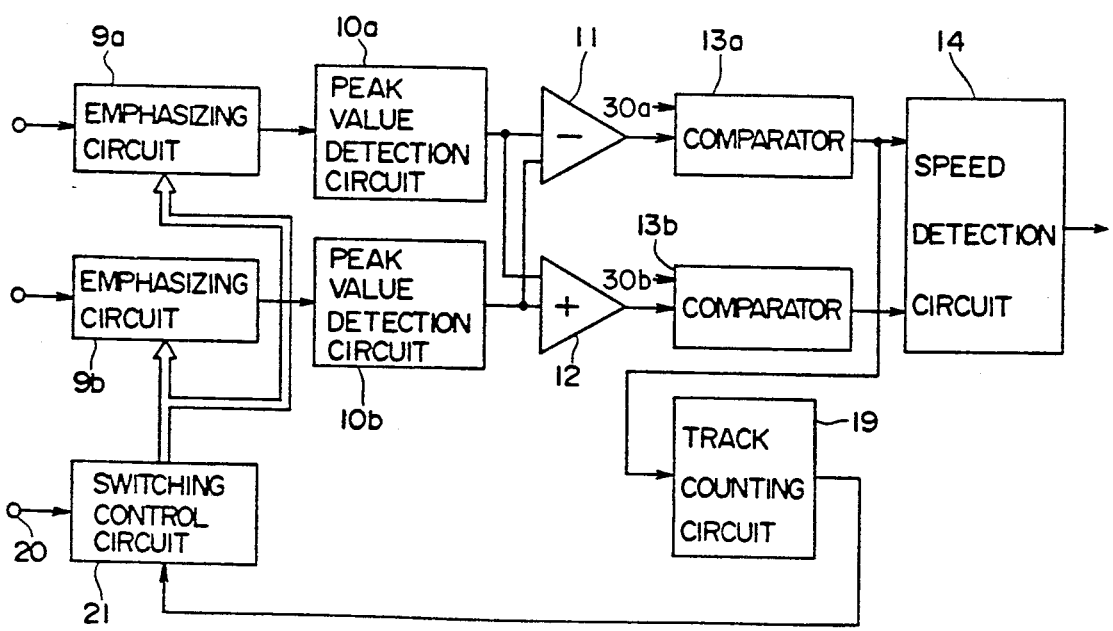
FIG. 5 is a block diagram of a modified embodiment of the same.
Figure 6:
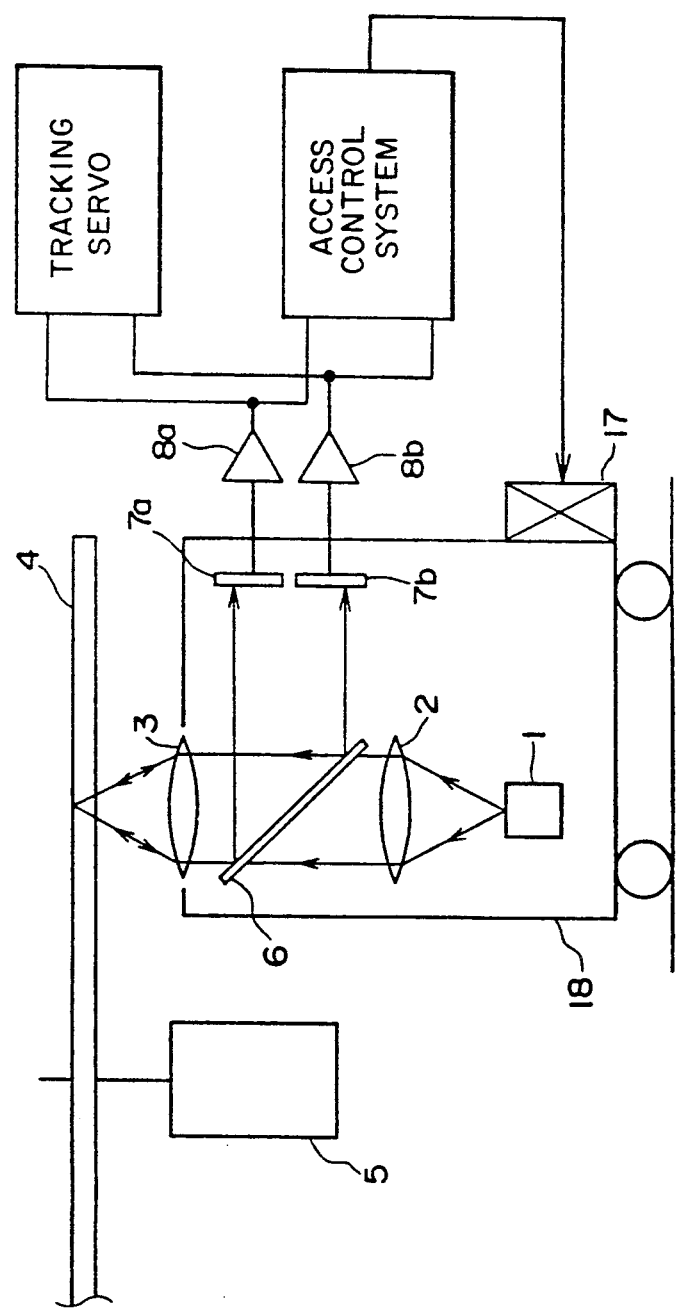
FIG. 6 is a block diagram relating to the access control system of FIG. 1 and further including the tracking servo.

Comparators 13a and 13b compare the outputs of differential amplifier 11 and adding amplifier 12 with the predetermined threshold value. These predetermined threshold values are illustrated in FIGS. 1 and 5 by respective inputs 30a and 30b.

On the basis of the output signals of both the comparators 13a and 13b, a speed detection circuit 14 detects the relative speeds in a radial direction between the beam spot condensed on the optical disc and the track thereof.

A differential amplifier 16 is given at a (−) terminal the output signal of the speed detection circuit 14, and at a (+) terminal a reference speed signal from a reference speed signal input terminal 15, thereby outputting a difference signal between the output signal and the reference speed signal.

A head motor 17 uses the output signal of the differential amplifier 16 as a control signal so as to drive an optical head 18 in the radial direction of the optical disc.

In addition, reference numeral 19 designates a track counting circuit which counts the number of times a track is traversed by the beam spot on the basis of the output signal of the comparator 13a.

In the optical disc driving apparatus of the invention constructed as described above, the laser beam emitted from the semiconductor laser 1 is converted into the parallel light beam by the collimator lens 2 and condensed by the condensing lens 3 to become the small spot on the disc 4 rotated by the disc motor 5. The reflected light from the disc 4 on which the information is recorded, including the recorded information and the information as to the track error, passes through the condensing lens 3, and is reflected by the beam splitter 6 to reach the photo detectors 7a and 7b. The reproduced information introduced into the photo detectors 7a and 7b is converted into current signals respectively, and then into voltage signals by the preamplifiers 8a and 8b respectively.

A method of obtaining the tracking sensor signal from the differential operation of the preamplifiers 8a and 8b is called the push pull method and is well known.

The reproduced optical signal thus converted into an electrical signal, has its gain versus frequency characteristic compensated for by the emphasizing circuits 9a and 9b and the envelope is detected by the peak detection circuits 10a and 10b. Next, the differential amplifier 11 and adding amplifier 12 obtain the difference signal and sum signal respectively.

The output signal of the differential amplifier 11 is not used as the sensor signal of the tracking servo as is the case in the conventional embodiment, but as the sensor signal for the access control system, the outputs of the differential amplifier 11 and adding amplifier 12 being converted by the comparators 13a and 13b into digital signals and inputted to the speed detection circuit 14.

Although not shown herein, the input waveform of the comparator may be subjected to a low pass filtering (LPF) process for the purpose of eliminating the component of the signal not used for the track traverse detection.

The speed detection circuit 14 detects the relative speed signal in the radial direction between the light spot and the track. The operation of the speed detection circuit 14, is disclosed in, for example, the Japanese Patent Application Laid Open No. 61-260474 (1986). The circuit detects the speed (the absolute value of speed) from the track traversing cycle period of the difference or sum signal and the direction (in the internally circumferential direction or the externally circumferential direction) from the phase relation between the aforesaid two signals.

A difference between the speed signal thus detected and the speed instruction value from the reference speed signal input terminal 15 is obtained by the differential amplifier 16 and the head motor 17 is driven according to the output of the amplifier 16, thereby executing the speed control of the optical head 18.

A track count circuit 19 counts up the number of times that a track is traversed, from the difference signal. Actually, the track counting circuit may use either the difference signal or the sum signal. The number of residual tracks until the target track is reached, is updated in the track counting circuit 19, each time a track is traversed, so that the speed instruction value is controlled corresponding to the number of remaining tracks so that the optical head is moved most accurately toward the target track.

FIG. 2 shows the optical disc, on only one track of which information is recorded, and reproduced signal waveforms therefrom.

In FIG. 2 (e), reference numeral 22 designates guide grooves on the optical disc, 23 designates a pit train recorded between the guide grooves 22, and 24 designates a path of the light spot which travels across the track.

FIG. 2-(a) shows the output of the preamplifier 8a, FIG. 2-(b) the output of the preamplifier 8b, FIG. 2-(c) the output (sum signal) of the adding amplifier 12, and FIG. 2-(d) the output (difference signal) of the differential amplifier 11. In addition, the portion shaded by vertical lines in each waveform is a modulated waveform caused by the recording pit train.

Accordingly, the signal waveforms change as the light spot travels. The solid line of the modulated waveforms shows an envelope peak detected by the peak detection circuit 10a or 10b.

FIG. 2 shows the case in which the optical frequency characteristic is flat and also the frequency characteristics of the emphasizing circuits 9a and 9b are flat.

In FIGS. 2-(c) and -(d), the one-dot chain lines show where the mean levels of the modulated waveforms would be in the sum signal and difference signal if no peak detection circuits such as 10a and 10b were used. The sum signal shown in FIG. 2-(d) omits the track traverse signal thus causing a disturbance in speed detection or track counting, thereby demonstrating that the peak detection circuits 10a and 10b are required.

FIG. 3 shows a difference in each reproduced signal processing waveform caused by a difference in the amount of frequency compensation.

FIG. 3-(a) shows the signal waveforms when the emphasizing circuits 9a and 9b do not compensate enough or at all for the decrease in the frequency response, so that the modulation amplitude decreases due to the decrease in the frequency response. Before the signal is recorded, the waveform created by track traversing is sinusoidal. The level of the output signal envelope of the adding amplifier 12 decreases due to the recorded information signal from the envelope 121 (shown by the two-dot-chain line) prior to the recording. Hence, the level of the waveform decreases to below the reference level R (shown by the one dot-chain line) of the succeeding stage comparator, therefore making detection of a track traverse impossible. This state results in an incorrect track count for access control, and an unstable speed detected from the track traverse cycle period. The output signal of the differential amplifier 11 significantly decreases in amplitude at the recorded portion of the disc and therefore cannot be directly used as the sensor waveform for the tracking servo.

FIG. 3-(b) shows the signal amplitudes when the amount of compensation performed by the emphasizing circuits 9a and 9b is proper. Here it can be seen that the decreased envelope waveform has been regenerated back into the original waveform. In this case, therefore, the access control system is stable in operation.

FIG. 3-(c) shows the signal amplitudes when the amount of compensation performed by the emphasizing circuits 9a and 9b is excessive. The modulated waveform amplitude decrease becomes larger than the amplitude of the original waveform and therefore, the peak detected envelope waveform becomes larger than the proper waveform. The output signal of the differential amplifier 11 becomes significantly larger in amplitude than the correct value thereby making the signal unusuable for controlling the tracking servo. However, the timing with respect to crossing the reference level R of the comparator as shown by the one-dot chain line does not change greatly, therefore the output signal of the differential amplifier is usable to the access control system. The excess compensation simply becomes larger in amplitude thus increasing the margin to ensure stable control.

Next, it will be shown that the amount of compensation of the emphasizing circuits 9a and 9b, even when excessive, is not problematical.

It is a requirement that the optical disc reduce cross talk from any adjacent tracks, and that the modulation amplitude at an intermediate position A (see FIG. 3-(c)) between the tracks be almost zero. Hence, even for the case where there is excessive compensation, the envelope at the position A does not change with respect to the reference level R, and therefore the track traverse detection remains stable. In the experiment, the characteristics of the emphasizing circuits 9a and 9b were set to approximately properly compensate for the decrease in the frequency response of the innermost circumferential track on the optical disc. Despite excessive compensation at the outermost circumferential track, track traverse was found to be correctly detectable from the innermost to the outermost circumferential track without changing the compensation characteristics of the emphasizing circuits 9a and 9b.

Figure 4:
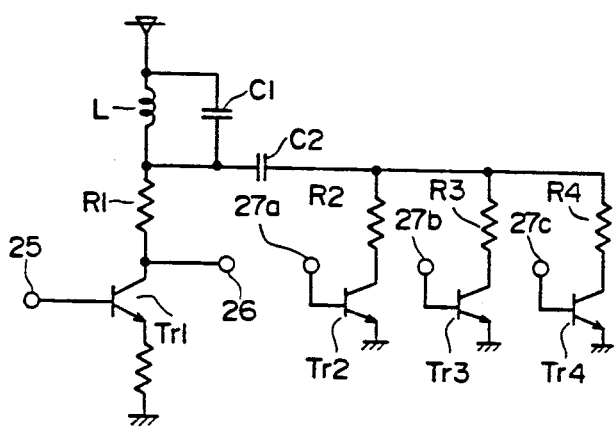
FIG. 4 is a circuit diagram of an example of an emphasizing circuit of the same.

FIG. 4 is a possible circuit implementation of each emphasizing circuit 9a or 9b.

In the drawings, reference numeral 25 designates an input terminal from the preamplifier 8a or 8b, 26 designates an output terminal, and 27a, 27b, and 27c designate control input terminals for switching the amount of compensation. The parallel resistances from $R_1$ through $R_4$ control the Q of a parallel oscillation system comprising a coil L and a capacitor $C_1$, thereby switching the amount of compensation. For example, when the input level to the control input terminal 27a is at a high level and the other terminals are at low levels, a transistor $Tr_2$ is on and transistors $Tr_3$ and $Tr_4$ are off thereby only the parallel resistances of $R_1$ and $R_2$ are effective. A capacitor $C_2$ serves to block any DC current so as not to directly affect the emphasis characteristic. The oscillation frequency of the coil L and capacitor $C_1$ need only be set to the bit frequency in the case of, for example, the 2-7 modulation scheme.

Next, FIG. 5 shows the principal portion of a second embodiment of the optical disc driving apparatus of the invention, in which the same components as those in the first embodiment will be designated by the same reference numerals.

An address input terminal 20 inputs the information of a radial position required for the access control. A switching control circuit 21 switches the amount of compensation for each emphasizing circuit 9a and 9b. During access control, switching circuit 21 switches the radial information for starting access from an address input terminal and an amount of movement from a track counting circuit 19, resulting in the proper amount of compensation. From experimental results, it has been confirmed that several stages are enough to guarantee correct operation.

In addition, although the switching timing of the switching control circuit 21 is controlled by the track counting circuit 19, when an address is detected during an access, the address information variable may be inputted into the access logic from the address input terminal 20 so as to obtain the switching timing only by the address information. Also, only the radial information of the access starting track and target track known in advance may be used to obtain the switching timing.

In the first and second embodiments, the information for the speed detection is obtained from the disc to perform speed control. The present invention is also applicable to the case where only the information of track counting amount is obtained from the disc and the information of speed detection is obtained from a glass scale provided at the exterior.

In addition, in the above embodiments the entire optical head is moved, but in a different type of optical head, only a movable portion thereof may be moved.

As can be seen from the above, the present invention utilizes the characteristic that the modulation amplitude near the center of a track and between tracks is about zero. Therefore, the emphasizing circuits are needed for only the access control, thereby enabling the amount of compensation of each emphasizing circuit to be used over a wide range from about moderate to excessive.

Hence, the number of stages of compensation for the frequency characteristic needed across the inner circumference to the outer circumference of the optical disc is greatly reduced. Therefore, circuitry can be simplified resulting in miniaturization and a low manufacturing cost of the optical disc driving apparatus of the invention.

As this invention may be embodied in several forms without departing from the spirit of the essential characteristics thereof, the present embodiment is therefore illustrative and not restricting, since the scope of the invention is defined by the appended claims rather than by the description preceding them. All changes that fall within the meets and bounds of the claims, or equivalence of such meets and bounds thereof are therefore intended to be embraced by the claims.

What is claimed is:

1. In an optical disc driving apparatus comprising:
   an optical head which position-controls optics that directs a light spot onto, and senses its reflection from, a track or a guide groove or between said guide grooves on an optical disc, so an optical sensor can reproduce information recorded on said track, and means for providing an error information signal regarding the position of said light spot relative to said track;
   a head moving mechanism for moving a part of said optical head in a radial direction of said optical disc when accessing a destination track;
   an access control system which controls the speed and direction of said head moving mechanism when moving toward a destination track;
   said access control system comprising;
      input emphasizing circuits for compensating lowering of a gain-frequency characteristic of the information signal reproduced by the optical sensor;
      peak detection circuits for detecting envelopes of output signals of said emphasizing circuits respectively;
      comparators for converting said output signals of said peak detection circuits into digital signals, respectively; and
      a track count circuit for detecting the number of tracks traversed on the basis of the output signal of one of said comparators;
   a tracking servo to maintain said light spot on said track;
   means for coupling said error information signal to said input emphasizing circuits of said access control system; and
   means for coupling said error information signal to said tracking servo, said tracking servo being separate from and bypassing said access control system.

2. An optical disc driving apparatus as set forth in claim 1, wherein said access control system further comprises a compensation amount switching control circuit for switching the compensation amount of said emphasizing circuits on the basis of a count value of said track count circuit and the information of access starting position.

3. An optical disc driving apparatus as set forth in claim 1, wherein said access control system further comprises a summing circuit for creating the sum of the peak detector circuits outputs, and a difference circuit for creating the difference of the peak detector circuits outputs.

4. An optical disc driving apparatus as set forth in claim 2, wherein said access control system further comprises a speed detection circuit which detects the relative speed of said light spot to said track on the basis of the output signals of said comparators.

5. In an optical disc driving apparatus comprising:
   an optical head which position-controls optics that directs a light spot onto, and senses its reflection from, a track or a guide groove or between said guide grooves on an optical disc, so an optical sensor can reproduce information recorded on said track, and means for providing an error information signal regarding the position of said light spot relative to said track;
   a head moving mechanism for moving a part of said optical head in a radial direction of said optical disc when accessing a destination track;
   an access control system which controls the speed and direction of said head moving mechanism when moving toward a destination track;
   said access control system comprising;
      input emphasizing circuits for compensation lowering of a gain-frequency characteristic of the information signal reproduced by the optical sensor;
      peak detection circuits for detecting envelopes of output signals of said emphasizing circuits respectively;
      comparators for converting said output signals of said peak detection circuits into digital signals, respectively; and
      a speed detection circuit which detects the relative speed of said light spot on said track on the basis of the output signals of said comparators;
   a tracking servo to maintain said light spot on said track;
   means for coupling said error information signal to said input emphasizing circuits of said access control system; and
   means for coupling said error information signal to said tracking servo, said tracking servo being separate from and bypassing said access control system.

6. An optical disc driving apparatus as set forth in claim 5, wherein said access control system further comprises a summing circuit for creating the sum of the peak detector circuits outputs, and a difference circuit for creating the difference of the peak detector circuits outputs.

7. An optical disc driving apparatus as set forth in claim 5, wherein said access control system further comprises:
   a track count circuit for detecting the number of tracks traversed on the basis of the output signal of one of said comparators; and
   a compensation amount switching control circuit for switching the compensation amount of said emphasizing circuits on the basis of a count value of said track count circuit and the information of access starting position.

* * * * *